US012749312B2

(12) United States Patent
Choi et al.

(10) Patent No.: US 12,749,312 B2
(45) Date of Patent: Sep. 29, 2026

(54) APPARATUS AND METHOD FOR GENERATING VIDEO DESCRIPTIONS BASED ON ARTIFICIAL NEURAL NETWORKS

(71) Applicant: RESEARCH COOPERATION FOUNDATION OF YEUNGNAM UNIVERSITY, Gyeongsangbuk-do (KR)

(72) Inventors: Gyu Sang Choi, Daegu (KR); Rafiq Ghazala, Gyeongsangbuk-do (KR)

(73) Assignee: RESEARCH COOPERATION FOUNDATION OF YEUNGNAM UNIVERSITY, Gyeongsangbuk-do (KR)

( * ) Notice: Subject to any disclaimer, the term of this patent is extended or adjusted under 35 U.S.C. 154(b) by 183 days.

(21) Appl. No.: 18/845,120

(22) PCT Filed: Apr. 12, 2024

(86) PCT No.: PCT/KR2024/004967

§ 371 (c)(1),
(2) Date: Sep. 9, 2024

(87) PCT Pub. No.: WO2024/262768

PCT Pub. Date: Dec. 26, 2024

(65) Prior Publication Data

US 2026/0188010 A1 Jul. 2, 2026

(30) Foreign Application Priority Data

Jun. 19, 2023 (KR) ........................ 10-2023-0078338

(51) Int. Cl.
*G06V 20/40* (2022.01)
*G06F 40/289* (2020.01)
(Continued)

(52) U.S. Cl.
CPC ............ *G06V 20/47* (2022.01); *G06F 40/289* (2020.01); *G06V 10/42* (2022.01); *G06V 10/82* (2022.01)

(58) Field of Classification Search
None
See application file for complete search history.

(56) References Cited

U.S. PATENT DOCUMENTS

| | | | | |
|---|---|---|---|---|
| 2002/0093591 A1* | 7/2002 | Gong | ................. | H04N 21/2368 348/E7.063 |
| 2021/0097887 A1* | 4/2021 | Lin | .......................... | G06N 3/08 |

(Continued)

FOREIGN PATENT DOCUMENTS

| | | |
|---|---|---|
| KR | 10-0792016 B1 | 1/2008 |
| KR | 10-1930940 B1 | 12/2018 |

(Continued)

OTHER PUBLICATIONS

International Search Report for PCT/KR2024/004967 mailed on Aug. 1, 2024.

(Continued)

*Primary Examiner* — SJ Park
(74) *Attorney, Agent, or Firm* — The PL Law Group, PLLC

(57) ABSTRACT

An apparatus for generating video descriptions according to an embodiment is a video description generating apparatus based on artificial neural networks, including one or more processors and a memory storing one or more programs executed by the one or more processors, and the apparatus includes a feature generating module that extracts a plurality of preset features from a video and generates one synthetic feature based on the plurality of extracted features and a description generating module that receives the synthetic feature and outputs a description text for the video.

11 Claims, 7 Drawing Sheets

(51) Int. Cl.
*G06V 10/42* (2022.01)
*G06V 10/82* (2022.01)

(56) References Cited

U.S. PATENT DOCUMENTS

| | | | | |
|---|---|---|---|---|
| 2022/0132179 | A1* | 4/2022 | Bennett-James | G06V 20/70 |
| 2024/0221401 | A1* | 7/2024 | Ye | G06V 10/44 |

FOREIGN PATENT DOCUMENTS

| | | | |
|---|---|---|---|
| KR | 10-2019-0093722 | A | 8/2019 |
| KR | 10-2021-0114074 | A | 9/2021 |
| KR | 10-2021-0117207 | A | 9/2021 |
| KR | 10-2022-0018336 | A | 2/2022 |
| KR | 10-2616354 | B1 | 12/2023 |

OTHER PUBLICATIONS

Office action issued on Aug. 25, 2024 from Korean Patent Office in a counterpart Korean Patent Application No. 10-2023-0078338 (all the cited references are listed in this IDS.) (English translation is also submitted herewith.).

* cited by examiner

FIG. 3

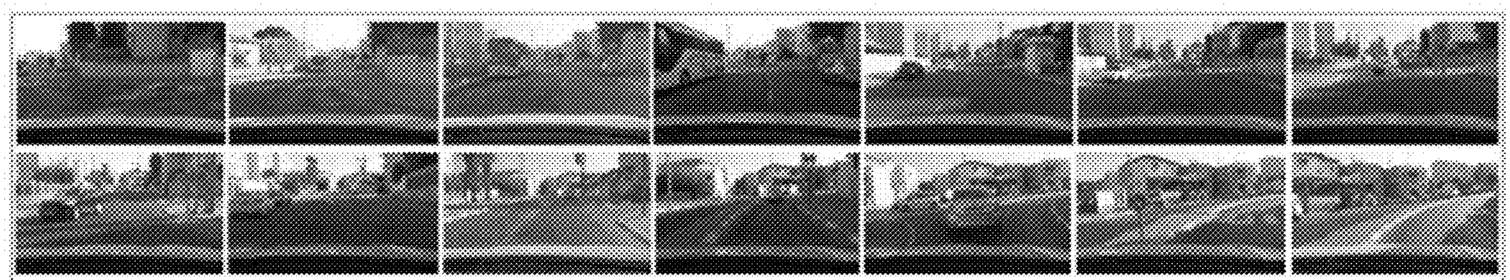

GROUND TRUTH DESCRIPTION

- The vehicle moves in a residential area.
- It is daytime.
- The road is curvy.
- Pedestrians are visible on the sidewalk.
- A white bus is parked on the left side of the road.
- Power poles are visible on the roadside.
- A black car moves out from the right side of the road and crosses the road.
- The vehicle stops for a while following a silver car.
- The vehicle moves to the right side of the road.
- Palm trees are visible on the left side of the road.
- Cars are parked on roadside.
- Direction signboards are visible on both sides of the road.
- Road is almost empty.

APPARATUS AND METHOD FOR GENERATING VIDEO DESCRIPTIONS BASED ON ARTIFICIAL NEURAL NETWORKS

CROSS REFERENCE TO RELATED APPLICATION AND CLAIM OF PRIORITY

This application claims benefit under 35 U.S.C. 119, 120, 121, or 365(c), and is a National Stage entry from International Application No. PCT/KR2024/004967, filed Apr. 12, 2024, which claims priority to the benefit of Korean Patent Application No. 10-2023-0078338 filed in the Korean Intellectual Property Office on Jun. 19, 2023, the entire contents of which are incorporated herein by reference.

BACKGROUND

1. Technical Field

Embodiments of the present invention relate to a technology for generating video descriptions.

2. Background Art

Conversion of visual information from video to text is insufficient to comprehensively interpret its content, and object detection or motion detection within the video may be of some help in generating captions for images. Here, it is essential for a video description model to understand and reflect all the visual cues in the video.

SUMMARY

An embodiment of the present invention provides an apparatus and a method for generating video descriptions, capable of generating accurate description text for a video.

An apparatus for generating video descriptions according to one embodiment is a video description generating apparatus based on artificial neural networks, including one or more processors and a memory storing one or more programs executed by the one or more processors, and the apparatus includes a feature generating module that extracts a plurality of preset features from a video and generates one synthetic feature based on the plurality of extracted features and a description generating module that receives the synthetic feature and outputs a description text for the video.

The feature generating module may include a first feature extractor provided to receive the video and extract spectral features from the video, a second feature extractor provided to receive the video and extract spatial features from the video, a third feature extractor provided to receive the video and extract optical flow features from the video, a fourth feature extractor provided to receive one or more sentences describing the video and extract text features from the sentences, and a synthesizer that generates the synthetic feature based on the spectral features, the spatial features, the optical flow features, and the text features.

The sentence input into the fourth feature extractor may be a ground truth corresponding to the description text.

The first feature extractor may include a plurality of sequentially connected Fourier transform neural networks the Fourier transform neural network may include a Fourier convolution layer that performs a Fourier convolution on frames of the video to extract a first sub-feature, a standard convolution layer that performs a convolution on the frames of the video to extract a second sub-feature, and a connection layer that connects the first sub-feature and the second sub-feature to generate the spectral features.

The Fourier convolution layer may generate a frequency spectrum for the frame by performing a Fourier transform on the frame and extract the first sub-feature by performing an inverse Fourier transform after applying a low pass filter to the frequency spectrum.

In the Fourier convolution layer of the plurality of Fourier transform neural networks, a Fourier frequency mode may use a descending mode.

The description generating module may include an encoder that receives the synthetic feature and generates an attention sequence vector from the synthetic feature and a decoder that receives the attention sequence vector, generates a final output vector from the attention sequence vector, and outputs the description text based on the final output vector.

A method for generating video descriptions according to one disclosed embodiment is a method that is performed in a computing device including one or more processors and a memory storing one or more programs executed by the one or more processors, including extracting, at a feature generating module, a plurality of preset features from a video and generating one synthetic feature based on the plurality of extracted features and receiving, at a description generating module, the synthetic feature and outputting a description text for the video.

The generating of the synthetic feature may include receiving, at a first feature extractor, the video and extracting spectral features from the video, receiving, at a second feature extractor, the video and extracting spatial features from the video, receiving, at a third feature extractor, the video and extracting optical flow features from the video, receiving, at a fourth feature extractor, one or more sentences describing the video and extracting text features from the sentences, and generating, at a synthesizer, the synthetic feature based on the spectral features, the spatial features, the optical flow features, and the text features.

The sentence input into the fourth feature extractor may be a ground truth corresponding to the description text.

The first feature extractor may include a plurality of sequentially connected Fourier transform neural networks The extracting of the spectral features may include performing, at a Fourier convolution layer, a Fourier convolution on frames of the video to extract a first sub-feature, performing, at a standard convolution layer, a convolution on the frames of the video to extract a second sub-feature, and connecting, at a connection layer, the first sub-feature and the second sub-feature to generate the spectral features.

The extracting of the first sub-feature may include generating a frequency spectrum for the frame by performing a Fourier transform on the frame and extracting the first sub-feature by performing an inverse Fourier transform after applying a low pass filter to the frequency spectrum.

In the Fourier convolution layer of the plurality of Fourier transform neural networks, a Fourier frequency mode may use a descending mode.

The outputting of the description text may include receiving, at an encoder, the synthetic feature and generating an attention sequence vector from the synthetic feature and receiving, at a decoder, the attention sequence vector, generating a final output vector from the attention sequence vector, and outputting the description text based on the final output vector.

According to the disclosed embodiment, by generating a synthetic feature based on spectral features, spatial features, optical flow features, and text features for a video and then outputting a description text of the video through a transformer including an encoder and a decoder, it is possible to generate a descriptive summary that well reflects the context of the video.

BRIEF DESCRIPTION OF THE DRAWINGS

FIG. 3 is a view showing sentences describing a video according to one embodiment of the present invention.

DETAILED DESCRIPTION

Hereinafter, specific embodiments of the present invention will be described with reference to the accompanying drawings. The following detailed description is provided to assist in a comprehensive understanding of the methods, devices and/or systems described herein. However, the detailed description is only for illustrative purposes and the present invention is not limited thereto.

In describing the embodiments of the present invention, when it is determined that detailed descriptions of known technology related to the present invention may unnecessarily obscure the gist of the present invention, the detailed descriptions thereof will be omitted. The terms used below are defined in consideration of functions in the present invention, but may be changed depending on the customary practice, the intention of a user or operator, or the like. Thus, the definitions should be determined based on the overall content of the present specification. The terms used herein are only for describing the embodiments of the present invention, and should not be construed as limitative. Unless expressly used otherwise, a singular form includes a plural form. In the present description, the terms "including", "comprising", or the like are used to indicate certain characteristics, numbers, steps, operations, elements, and a portion or combination thereof, but should not be interpreted to preclude one or more other characteristics, numbers, steps, operations, elements, and a portion or combination thereof.

Further, it will be understood that, although the terms first, second, etc. may be used herein to describe various elements, these elements should not be limited by these terms. These terms may be used to distinguish one element from another element. For example, without departing from the scope of the present invention, a first element could be termed a second element, and similarly, a second element could be termed a first element.

Figure 1:
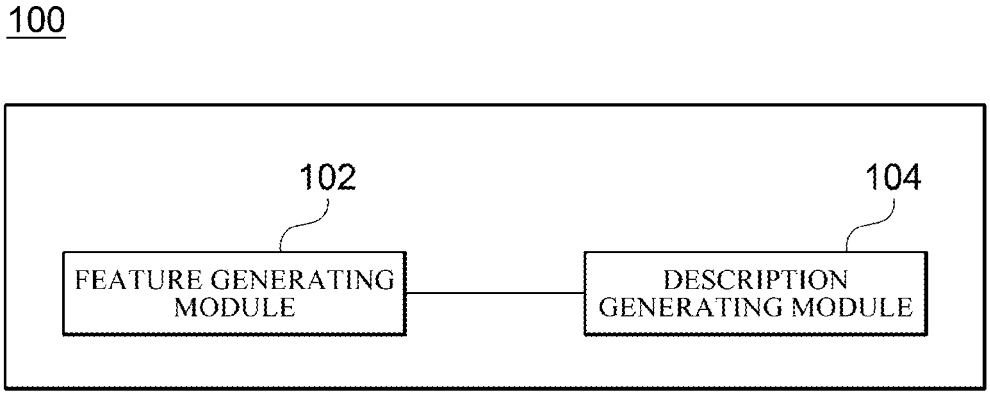
FIG. 1 is a block diagram showing a video description generating apparatus according to one embodiment of the present invention.
Figure 2:
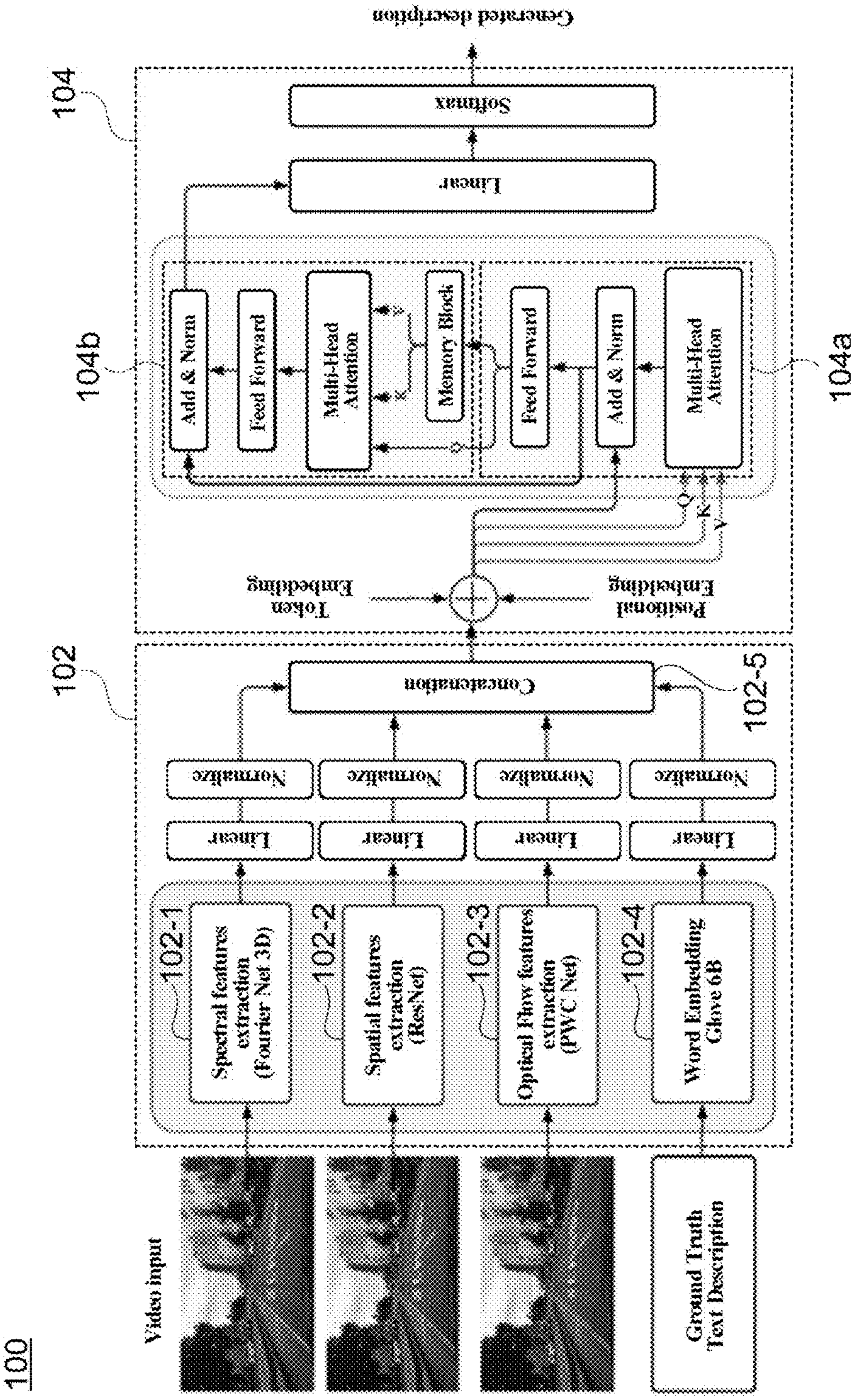
FIG. 2 is a diagram showing an architecture of the video description generating apparatus according to one embodiment of the present invention.

FIG. 1 is a block diagram showing an apparatus for generating video descriptions (or video description generating apparatus) according to one embodiment of the present invention, and FIG. 2 is a diagram showing an architecture of the video description generating apparatus according to one embodiment of the present invention.

Referring to FIGS. 1 and 2, a video description generating apparatus 100 may include a feature generating module 102 and a description generating module 104. The video description generating apparatus 100 may be an apparatus for generating a description of a video in text. The video description generating apparatus 100 may generate text for describing a video from the video using an artificial neural network-based technology.

The feature generating module 102 may extract a plurality of preset features from a video and generate one synthetic feature based on the plurality of extracted features. The feature generating module 102 may include a first feature extractor 102-1, a second feature extractor 102-2, a third feature extractor 102-3, a fourth feature extractor 102-4, and a synthesizer 102-5.

The first feature extractor 102-1 may be provided to receive the video and extract spectral features from the video. In one embodiment, the first feature extractor 102-1 may extract the spectral features from the video based on a Fourier convolutional neural network. That is, the first feature extractor 102-1 may use the Fourier convolutional neural network to extract the spectral features, which are information about nature-based physics patterns, from the video. In this case, natural-based physical patterns may follow linear and differential equations. A detailed description thereof will be provided below.

The second feature extractor 102-2 may be provided to receive the video and extract spatial features from the video. The second feature extractor 102-2 may be provided to extract the spatial features, which is appearance information for identifying an object, patterns, and a shape within the video, from the video. The second feature extractor 102-2 may extract the spatial features from the video using a convolutional neural network (CNN). In one embodiment, the second feature extractor 102-2 may extract the spatial features from the video using a pre-trained ResNet.

The third feature extractor 102-3 may be provided to receive the video and extract optical flow features from the video. Here, the optical flow features may be intended to provide information about the displacement of an object in successive frames within the video to which per-pixel motion estimation is applied. The third feature extractor 102-3 may extract the optical flow features from the video using the convolutional neural network (CNN). In one embodiment, the third feature extractor 102-3 may extract the optical flow features from the video using the pre-trained PWC-Net.

Here, the same video may be input to each of the first feature extractor 102-1 to the third feature extractor 102-3. In addition, the video description generating apparatus 100 may scale the video to a preset size (e.g., 224×224) and then input the scaled video to each of the first feature extractor 102-1 to the third feature extractor 102-3. In addition, the video description generating apparatus 100 may input the video to each of the first feature extractor 102-1 to the third feature extractor 102-3 in 64-frame units.

The fourth feature extractor 102-4 may receive one or more sentences describing the video. Here, the input sentences are a ground truth of the description of the video, and may include one or more sentences describing the frames included in the video. FIG. 3 is a view showing sentences describing a video according to one embodiment of the present invention. The fourth feature extractor 102-4 may extract text features from sentences (ground truth) describing the video. The fourth feature extractor 102-4 may extract text features by tokenizing each sentence describing the video into preset units and then embedding each token.

Here, the spectral features, the spatial features, the optical flow features, and the text features extracted from the first feature extractor 102-1, the second feature extractor 102-2, the third feature extractor 102-3, and the fourth feature extractor 102-4 may be normalized after each passing through a linear layer.

The synthesizer 102-5 may generate a synthetic feature based on the spectral features, the spatial features, the optical flow features, and the text features. In one embodiment, the synthesizer 102-5 may generate a synthetic feature by concatenating the spectral features, the spatial features, the optical flow features, and the text features, but is not limited thereto, and may also generate a synthetic feature by fusing the spectral features, the spatial features, the optical flow features, and the text features.

The description generating module 104 may receive the synthetic feature from the feature generating module 102 and generate text (hereinafter, referred to as a description text) representing descriptions of the video based on the synthetic feature.

In one embodiment, the description generating module 104 may be implemented as a transformer model including an encoder 104*a* and a decoder 104*b*. The encoder 104*a* and the decoder 104*b* may each include a multi-head attention layer and a feed forward layer.

The description generating module 104 may input the synthetic feature transmitted from the feature generating module 102 into the encoder 104*a*. In this case, the description generating module 104 may provide a position vector related to the synthetic feature to the encoder 104*a*. The position vector may be information about the position of each word in the text feature.

The encoder 104*a* may serve as a visual model of the transformer. The encoder 104*a* may obtain a query (Q), a key (K), and a value (V) from input synthetic feature. Here, the query (Q), key (K), and value (V) may be calculated using the synthetic feature and a preset weight matrix. The encoder 104*a* may perform the multi-head attention based on the query Q, the key (K), and the value (V) to generate an attention sequence vector and then pass the attention sequence vector through the feed forward layer.

The decoder 104*b* may serve as a language model of the transformer. The decoder 104*b* may receive the attention sequence vector from the encoder 104*a* and generate a final output vector from the received attention sequence vector. The final output vector of the decoder 104*b* may be provided to pass through a linear layer and a softmax layer to output a description text. Since the structure and operation of the encoder and decoder of the transformer model are well-known technologies, a detailed description thereof will be omitted.

Figure 4:
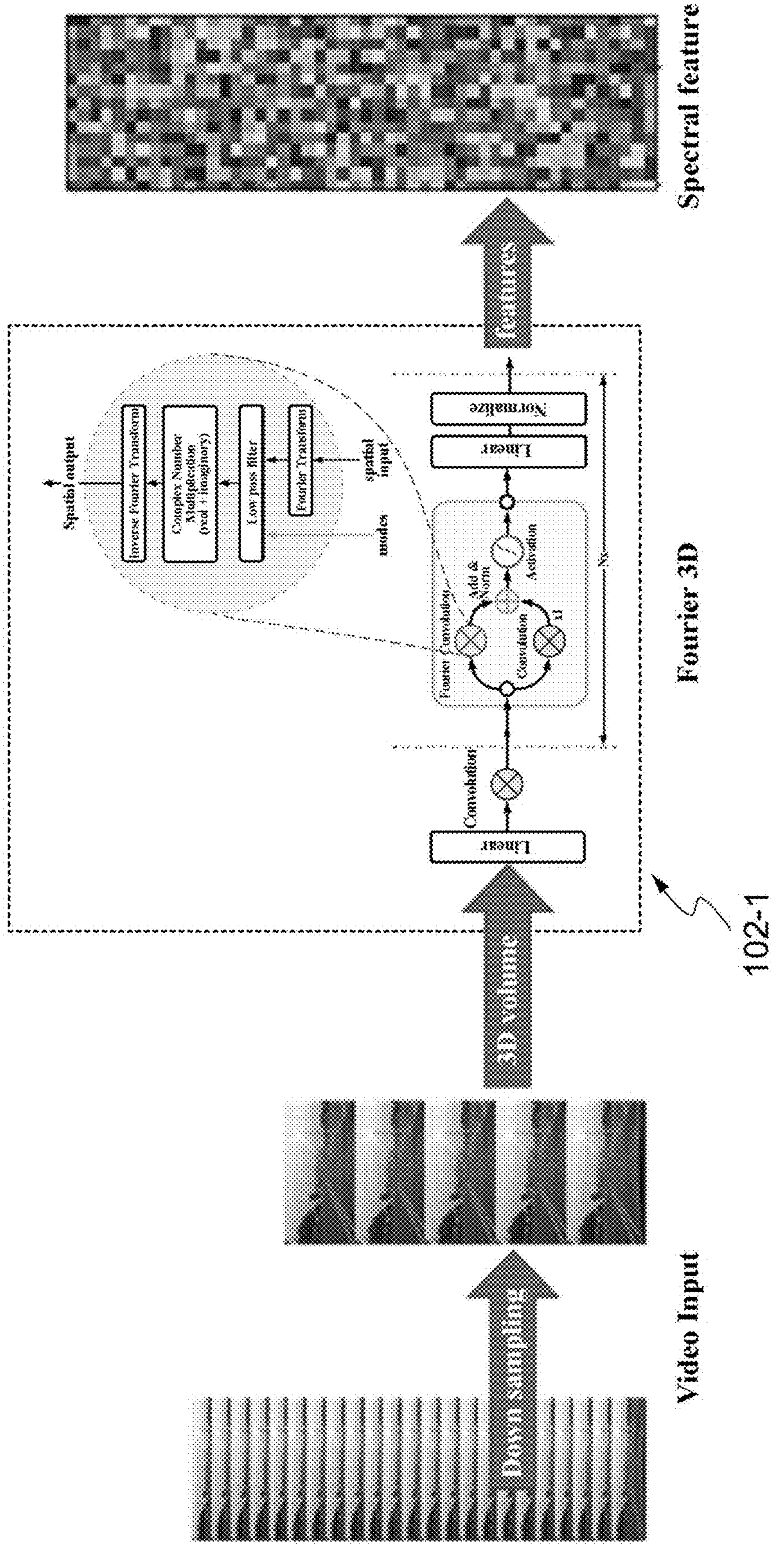
FIG. 4 is a diagram schematically showing a state of extracting spectral features through a first feature extractor according to one embodiment of the present invention.
Figure 5:
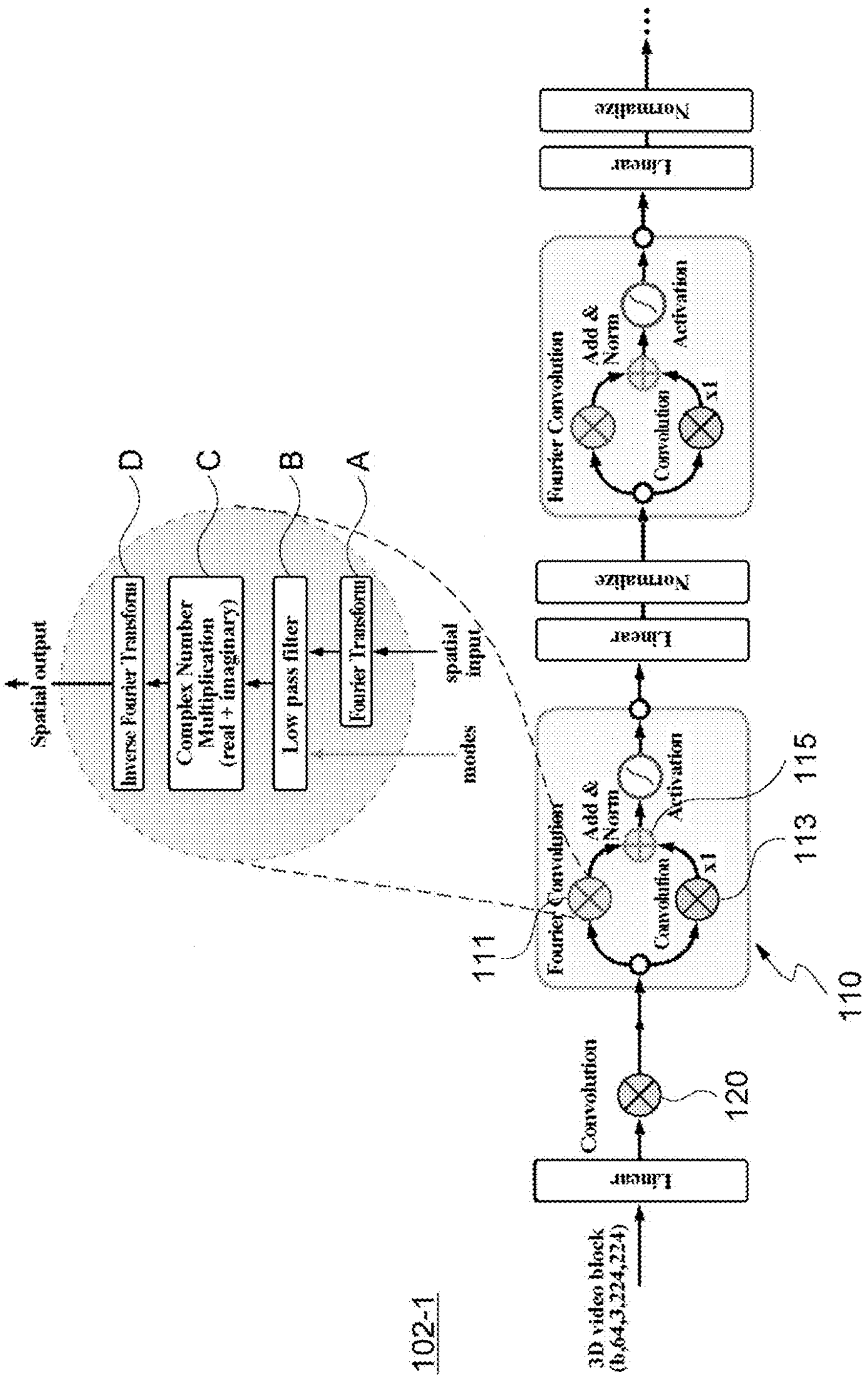
FIG. 5 is a diagram showing a neural network structure of the first feature extractor according to one embodiment of the present invention.

FIG. 4 is a diagram schematically showing a state of extracting spectral features through the first feature extractor according to one embodiment of the present invention, and FIG. 5 is a diagram showing a neural network structure of the first feature extractor according to one embodiment of the present invention.

Referring to FIGS. 4 and 5, the first feature extractor 102-1 may extract spectral features that capture a natural motion from a given video according to a pattern of a partial differential equation.

The first feature extractor 102-1 may transform pixel values from the spatial domain to the frequency domain for each frame of the video, resulting in generation of a frequency spectrum in which each frequency component contributes to the original frame. By analyzing the frequency spectrum obtained from the Fourier transform, spectral features unique to each frame of the video may be extracted. The spectral features may include a periodic pattern, a texture variation, or spatial arrangement characteristics, unique to the corresponding frame of the video.

The first feature extractor 102-1 may include a plurality of Fourier transform neural networks 110. The plurality of Fourier transform neural networks 110 may be sequentially connected. In this case, an output of a Fourier transform neural network 110 may be used as an input of a next Fourier transform neural network 110.

64×3×224×224 frames may be input into the first feature extractor 102-1 in each batch. That is, a 3D frame of size 224×224 may be input in units of 64 frames. The number of channels of the input frame may be adjusted through the convolution unit 120. That is, the convolution unit 120 may reconstruct a tensor of the input frame to a desired width. The convolution unit 120 may perform 1×1 convolution on the input frame. That is, the convolution unit 120 may perform the convolution on the input frame through a filter having a size of 1×1. In this case, the convolution unit 120 plays a role in adjusting the number of channels of the input frame.

The Fourier transform neural network 110 may include a Fourier convolution layer 111, a standard convolution layer 113, and a connection layer 115.

The Fourier convolution layer 111 may perform Fourier convolution on the input frame to output a first sub-feature. Specifically, the Fourier convolution layer 111 may perform a Fourier transform on the input frame (A). That is, the Fourier convolution layer 111 may generate a frequency spectrum by converting a frame from a spatial domain to a frequency domain. The conversion may be represented by the following Equation 1.

$$F(k) = \int_{-\infty}^{\infty} f(x)e^{-2\pi ikx}dx \quad \text{(Equation 1)}$$

Here, F(k) may denote the Fourier transform of a signal f(x) at a frequency k, i denotes an imaginary number, and the integration is taken for all time values x.

Next, the Fourier convolution layer 111 may apply a low pass filter to the frequency spectrum (B). Accordingly, in the frequency spectrum, high-frequency components are suppressed and low-frequency components are maintained. In one embodiment, a Gaussian filter may be used as the low pass filter. In this case, as the frequency increases, a filter effect gradually increases, which may smooth the image of the corresponding frame.

Next, the Fourier convolution layer 111 may handle complex multiplication of real and imaginary parts (C). In addition, the Fourier convolution layer 111 may output the first sub-feature by applying an inverse Fourier transform to the Fourier-transformed signal F(k) (D). That is, the Fourier convolution layer 111 may convert the Fourier-transformed signal from the frequency domain back to the spatial domain. The conversion may be represented by the following Equation 2.

$$f(x) = \left(\frac{1}{2\pi}\right)\int_{-\infty}^{\infty} F(k)^{2\pi ikx}dk \quad \text{(Equation 2)}$$

Here, f(x) may represent a signal in the spatial domain, and F(k) may represent a signal in the frequency domain.

The standard convolution layer 113 may extract a second sub-feature from the input frame. The standard convolution layer 113 may be provided in parallel with the Fourier convolution layer 111. The standard convolution layer 113 may perform a general convolution on the input frame to extract the second sub-feature.

The connection layer 115 may generate the spectral features by connecting the first sub-feature output from the Fourier convolution layer 111 and the second sub-feature output from the standard convolution layer 113. The spectral features output from the connection layer 115 may be linearized and normalized through activation.

Meanwhile, in the Fourier convolution layer 111 of a plurality of sequentially connected Fourier transform neural networks 110, a descending mode may be used to provide different spectral features in a subsequent Fourier transform neural network. Here, the descending mode may mean the descending order of the Fourier frequency mode. The Fourier frequency mode may be a mode for defining a frequency band of a frequency spectrum through the Fourier transform.

In one embodiment, when four Fourier transform neural networks 110 are sequentially connected, in order to capture a low-frequency feature in a subsequent Fourier transform neural network, the descending mode may be used so that the Fourier frequency mode of the subsequent Fourier transform neural network is half the Fourier frequency mode of the preceding Fourier transform neural network, such as the order of the first Fourier transform neural network of the Fourier frequency mode 8, the second Fourier transform neural network of the Fourier frequency mode 4, the third Fourier transform neural network of the Fourier frequency mode 2, and the fourth Fourier transform neural network of the Fourier frequency mode 1.

According to the disclosed embodiment, by generating the synthetic feature based on the spectral features, the spatial features, the optical flow features, and the text features for the video and then outputting the description text of the video through the transformer including an encoder and a decoder, it is possible to generate a descriptive summary that well reflects the context of the video.

In the present specification, a module may mean a functional and structural combination of hardware for carrying out the technical idea of the present invention and software for driving the hardware. For example, the "module" may mean a logical unit of a predetermined code and a hardware resource for executing the predetermined code, and does not necessarily mean physically connected code or a single type of hardware.

Figure 6:
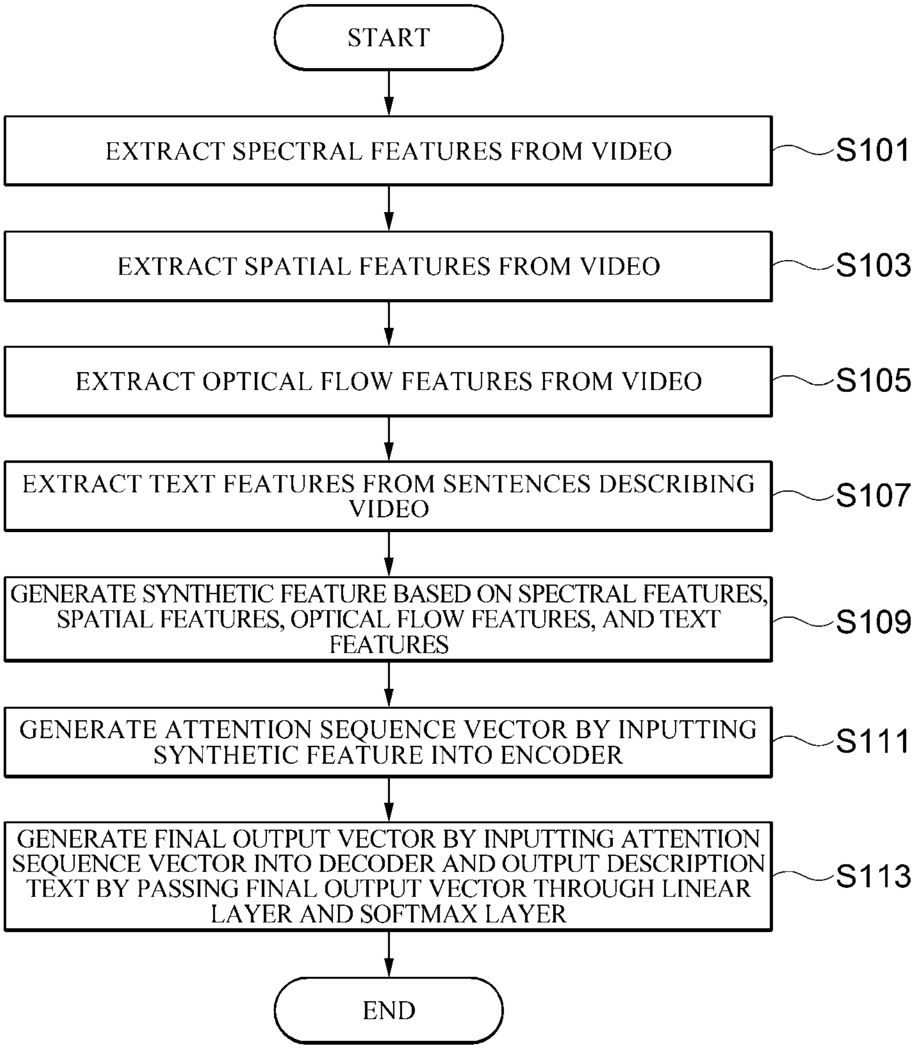
FIG. 6 is a flowchart for describing a method for generating video descriptions according to one embodiment of the present invention.

FIG. 6 is a flowchart for describing a method for generating video descriptions according to one embodiment of the present invention. In the illustrated flowchart, the method is divided into a plurality of steps; however, at least some of the steps may be performed in a different order, performed together in combination with other steps, omitted, performed in subdivided steps, or performed by adding one or more steps not illustrated.

Referring to FIG. 6, the video description generating apparatus 100 may extract spectral features from a video through the first feature extractor 102-1 (S101). The video description generating apparatus 100 may extract spatial features from the video through the second feature extractor 102-2 (S103). The video description generating apparatus 100 may extract an optical flow features from the video through the third feature extractor 102-3 (S105). The video description generating apparatus 100 may extract text features from sentences describing the video through the fourth feature extractor 102-4 (S107).

The video description generating apparatus 100 may generate a synthetic feature based on the spectral features, the spatial features, the optical flow features, and the text features (S109). The video description generating apparatus 100 may input the synthetic feature into the encoder 104*a* to generate an attention sequence vector (S111) The video description generating apparatus 100 may input the attention sequence vector into the decoder 104*b* to generate a final output vector, and output a description text by passing the final output vector through a linear layer and a softmax layer (S113).

Figure 7:
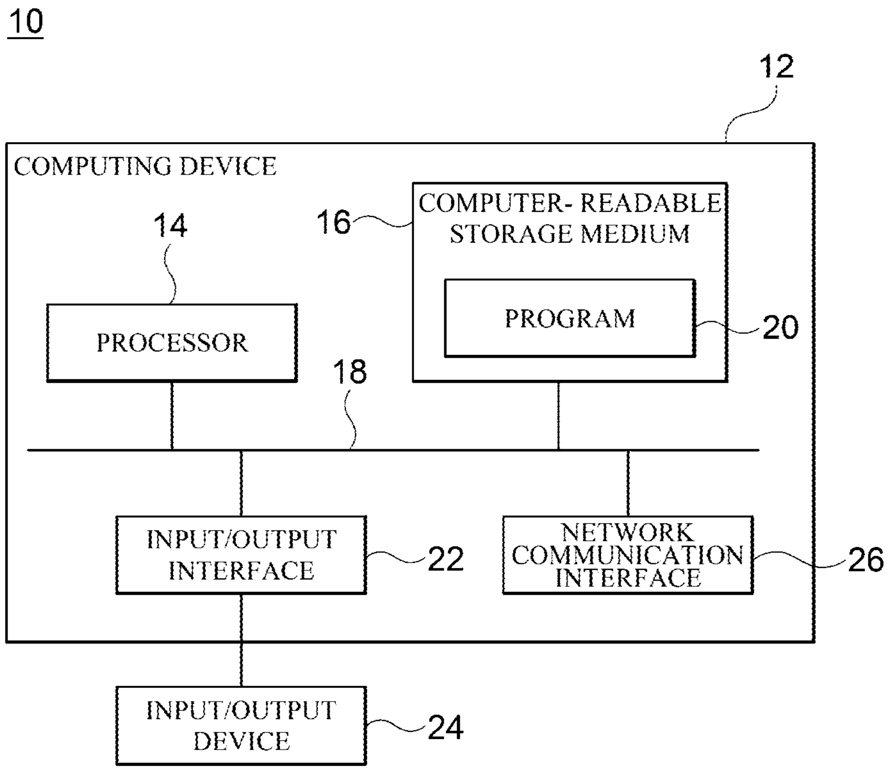
FIG. 7 is a block diagram exemplarily illustrating a computing environment that includes a computing device suitable for use in exemplary embodiments.

FIG. 7 is a block diagram exemplarily illustrating a computing environment 10 that includes a computing device suitable for use in exemplary embodiments. In the illustrated embodiment, each component may have a different function and capability in addition to those described below, and additional components may be included in addition to those described below.

The illustrated computing environment 10 includes a computing device 12. In one embodiment, the computing device 12 may be the video description generating apparatus 100.

The computing device 12 includes at least one processor 14, a computer-readable storage medium 16, and a communication bus 18. The processor 14 may cause the computing device 12 to operate according to the above-described exemplary embodiments. For example, the processor 14 may execute one or more programs stored in the computer-readable storage medium 16. The one or more programs may include one or more computer-executable instructions, which may be configured to cause, when executed by the processor 14, the computing device 12 to perform operations according to the exemplary embodiments.

The computer-readable storage medium 16 is configured to store computer-executable instructions or program codes, program data, and/or other suitable forms of information. A program 20 stored in the computer-readable storage medium 16 includes a set of instructions executable by the processor 14. In one embodiment, the computer-readable storage medium 16 may be a memory (a volatile memory such as a random-access memory, a non-volatile memory, or any suitable combination thereof), one or more magnetic disk storage devices, optical disc storage devices, flash memory devices, other types of storage media that are accessible by the computing device 12 and may store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 via the input/output interface 22. The exemplary input/output device 24 may include a pointing device (a mouse, a trackpad, or the like), a keyboard, a touch input device (a touch pad, a touch screen, or the like), a voice or sound input device, input devices such as various types of sensor devices and/or imaging devices, and/or output devices such as a display device, a printer, an interlocutor, and/or a network card. The exemplary input/output device 24 may be included inside the computing device 12 as one of components constituting the computing device 12, or may be connected to the computing device 12 as a separate device distinct from the computing device 12.

Although the representative embodiments of the present invention have been described in detail as above, those skilled in the art will understand that various modifications may be made thereto without departing from the scope of the present invention. Therefore, the scope of rights of the present invention should not be limited to the described embodiments, but should be defined not only by the claims set forth below but also by equivalents of the claims.

What is claimed is:

1. An apparatus for generating video descriptions, the apparatus including one or more processors and a memory storing one or more programs executed by the one or more processors, the apparatus comprising:

a feature generating module configured to extract a plurality of preset features from a video and generate a synthetic feature based on the plurality of extracted features; and a description generating module configured to receive the synthetic feature and output a description text for the video, wherein the feature generating module includes:

a first feature extractor configured to receive the video and extract spectral features from the video;

a second feature extractor configured to receive the video and extract spatial features from the video;

a third feature extractor configured to receive the video and extract optical flow features from the video;

a fourth feature extractor configured to receive one or more sentences describing the video and extract text features from the sentences; and a synthesizer configured to generate the synthetic feature based on the spectral features, the spatial features, the optical flow features, and the text features, wherein the first feature extractor includes a plurality of sequentially connected Fourier transform neural networks so that an output of a Fourier transform neural network is used as an input of a next Fourier transform neural network, and the Fourier transform neural network includes:

a Fourier convolution layer that sequentially performs a Fourier transform and an inverse Fourier transform on frames of the video to extract a first sub-feature;

a standard convolution layer that performs a convolution on the frames of the video to extract a second sub-feature; and a connection layer that connects the first sub-feature and the second sub-feature to generate the spectral features.

2. The apparatus of claim 1, wherein the sentence input into the fourth feature extractor is a ground truth corresponding to the description text.

3. The apparatus of claim 1, wherein the Fourier convolution layer is configured to generate a frequency spectrum for the frame by performing a Fourier transform on the frame and extract the first sub-feature by performing an inverse Fourier transform after applying a low pass filter to the frequency spectrum.

4. The apparatus of claim 1, wherein in the Fourier convolution layer of the plurality of Fourier transform neural networks, a Fourier frequency mode uses a descending mode.

5. The apparatus of claim 1, wherein the description generating module includes:

an encoder configured to receive the synthetic feature and generate an attention sequence vector from the synthetic feature; and a decoder configured to receive the attention sequence vector, generate a final output vector from the attention sequence vector, and output the description text based on the final output vector.

6. A method for generating video descriptions that is performed in a computing device including one or more processors and a memory storing one or more programs executed by the one or more processors, the method comprising:

extracting, at a feature generating module, a plurality of preset features from a video and generating one synthetic feature based on the plurality of extracted features; and receiving, at a description generating module, the synthetic feature and outputting a description text for the video, wherein the generating of the synthetic feature includes:

receiving, at a first feature extractor, the video and extracting spectral features from the video;

receiving, at a second feature extractor, the video and extracting spatial features from the video;

receiving, at a third feature extractor, the video and extracting optical flow features from the video;

receiving, at a fourth feature extractor, one or more sentences describing the video and extracting text features from the sentences; and generating, at a synthesizer, the synthetic feature based on the spectral features, the spatial features, the optical flow features, and the text features, wherein the first feature extractor includes a plurality of sequentially connected Fourier transform neural networks so that an output of a Fourier transform neural network is used as an input of a next Fourier transform neural network, and the extracting of the spectral features includes:

sequentially performing, at a Fourier convolution layer, a Fourier transform and an inverse Fourier transform on frames of the video to extract a first sub-feature;

performing, at a standard convolution layer, a convolution on the frames of the video to extract a second sub-feature; and connecting, at a connection layer, the first sub-feature and the second sub-feature to generate the spectral features.

7. The method of claim 6, wherein the sentence input into the fourth feature extractor is a ground truth corresponding to the description text.

8. The method of claim 6, wherein the extracting of the first sub-feature includes:

generating a frequency spectrum for the frame by performing a Fourier transform on the frame; and extracting the first sub-feature by performing an inverse Fourier transform after applying a low pass filter to the frequency spectrum.

9. The method of claim 6, wherein in the Fourier convolution layer of the plurality of Fourier transform neural networks, a Fourier frequency mode uses a descending mode.

10. The method of claim 6, wherein the outputting of the description text includes:

receiving, at an encoder, the synthetic feature and generating an attention sequence vector from the synthetic feature; and receiving, at a decoder, the attention sequence vector, generating a final output vector from the attention sequence vector, and outputting the description text based on the final output vector.

11. A computer program stored in a non-transitory computer readable storage medium, comprising one or more instructions that, when executed by a computing device having one or more processors, cause the computing device to perform operations of:

extracting, at a feature generating module, a plurality of preset features from a video and generating one synthetic feature based on the plurality of extracted features; and receiving, at a description generating module, the synthetic feature and outputting a description text for the video, the generating of the synthetic feature includes:

receiving, at a first feature extractor, the video and extracting spectral features from the video;

receiving, at a second feature extractor, the video and extracting spatial features from the video;

receiving, at a third feature extractor, the video and extracting optical flow features from the video;

receiving, at a fourth feature extractor, one or more sentences describing the video and extracting text features from the sentences; and generating, at a synthesizer, the synthetic feature based on the spectral features, the spatial features, the optical flow features, and the text features, wherein the first feature extractor includes a plurality of sequentially connected Fourier transform neural networks so that an output of a Fourier transform neural network is used as an input of a next Fourier transform neural network, and the extracting of the spectral features includes:

sequentially performing, at a Fourier convolution layer, a Fourier transform and an inverse Fourier transform on frames of the video to extract a first sub-feature;

performing, at a standard convolution layer, a convolution on the frames of the video to extract a second sub-feature; and connecting, at a connection layer, the first sub-feature and the second sub-feature to generate the spectral features.

* * * * *